US006391332B1

(12) United States Patent
Somerville et al.

(10) Patent No.: US 6,391,332 B1
(45) Date of Patent: May 21, 2002

(54) THERAPEUTIC MICRONUTRIENT COMPOSITION FOR SEVERE TRAUMA, BURNS AND CRITICAL ILLNESS

(75) Inventors: Joann A. Somerville, Reading; J. Dale Sherratt, Boston, both of MA (US)

(73) Assignee: Baxter International, Inc., Deerfield, IL (US)

( * ) Notice: Subject to any disclaimer, the term of this patent is extended or adjusted under 35 U.S.C. 154(b) by 0 days.

(21) Appl. No.: 09/553,555

(22) Filed: Apr. 20, 2000

(51) Int. Cl.$^7$ ............................................... A61K 47/00
(52) U.S. Cl. ........................................................ 424/439
(58) Field of Search ................... 424/638, 439

(56) References Cited

U.S. PATENT DOCUMENTS 6,051,236 A  *  4/2000  Portman ................... 424/195.1
6,159,476 A  *  12/2000  Djananov et al. ........ 424/195.1

OTHER PUBLICATIONS

Mary Parry–Billings et al. "Does glutamine contribute to immunosuppression after major burns?" The Lancet vol. 336, pp. 523–525 (1990) Published by Williams & Wilkins.

Deborah R. Hunt, M.S., R.D. et al. "Selenium Depletion in Burn Patients" Journal of Parenteral and Enteral Nutrition vol. 8, No. 6, pp. 695–699 (1984) Published by American Society For Parenteral And Enteral Nutrition.

T.C. Welbourne et al. "Enteral glutamine supports hepatic glutathione efflux during inflammation" J. Nutr. Biochem., vol. 4, pp. 236–242 (Apr. 1993) Published by Butterworth–Heinemann.

Metaform / MetaPlexx, Weider Nutrition International, Inc., 98.*

* cited by examiner

*Primary Examiner*—Alton Pryor
(74) *Attorney, Agent, or Firm*—Jeffrey C. Nichols; Mark J. Buonaiuto; Francis C. Kowalik

(57) ABSTRACT

Compositions comprising glutamine in combination with other micronutrients, for example, N-acetyl-cysteine, L-arginine, and Vitamins A, C, D, E are disclosed. Such compositions can be administered to enhance recovery of patients with severe trauma, burns, injury, infection and for promoting wound healing.

28 Claims, No Drawings

THERAPEUTIC MICRONUTRIENT COMPOSITION FOR SEVERE TRAUMA, BURNS AND CRITICAL ILLNESS

BACKGROUND OF THE INVENTION

1. Field of the Invention

The present invention relates to the use of the amino acid glutamine in combination with additional micronutrients in a composition for treating stress responses associated with severe trauma, burns, injury, infection and for promoting wound healing.

2. Discussion of the Background of the Invention

Major injury, burns, trauma, infection, or any critical illness, characteristically lead to profound metabolic abnormalities, lean mass catabolism, ongoing oxidant induced tissue damage, immune deficiency states and impaired wound healing. The metabolic abnormalities lead to increased cell energy demands and inefficient nutrient utilization. Tissue damage is observed as progressive lipid peroxidation. An immune deficiency state can lead to increased infections. The addition of micronutrients to a patient's therapeutic regime enhances recovery from severe stree induced responses caused by injury, burns, or sepsis. Micronutrients are essential for cellular function and the addition of such to a patient with metabolic derangement and ongoing catabolism will enhance recovery.

SUMMARY OF THE INVENTION

The present invention comprises a micronutrient composition in unit dosage form comprising L-glutamine, L-arginine, N-acetyl-cysteine, vitamin A, vitamin C, vitamin E, Thiamin, riboflavin, niacin, vitamin $B_6$, folate, vitamin $B_{12}$, pantothenic acid, magnesium, zinc, selenium and copper.

In a preferred embodiment, the unit dosage form comprises about 140 mg of L-arginine per 10 g glutamine, about 600 mg of N-acetyl-cysteine per 10 g glutamine, about 5,000 IU of vitamin A per 10 g glutamine, about 500 mg of vitamin C per 10 g glutamine, about 200 IU of vitamin E per 10 g glutamine, about 6 mg of thiamin per 10 g glutamine, about 6.8 mg of riboflavin per 10 g glutamine, about 80 mg of niacin per 10 g glutamine, about 8 mg of vitamin $B_6$ per 10 g glutamine, about 400 $\mu$g of folate per 10 g glutamine, about 50 $\mu$g of vitamin $B_{12}$ per 10 g glutamine, about 40 mg of pantothenic acid per 10 g glutamine, about 200 mg of magnesium per 10 g glutarnine, about 20 mg of zinc per 10 g glutamine, about 100 $\mu$g of selenium per 10 g glutamine, and about 0.75 mg of copper per 10 g glutamine.

The present invention also relates to a method of treating a stress response associated with severe trauma, bums, injury or infection which comprises administering to a patient in need thereof at least one unit dosage of a micronutrient composition according to the present invention in a 24 hours period.

In another embodiment, the present invention relates to a method of treating stress induced catabolic disorders associated with severe trauma, bums, injury or infection which comprises administering to a patient in need thereof at least one unit dosage of a micronutrient composition according to the present invention in a 24 hours period.

Yet another embodiment of the present invention relates to a method of treating an immune deficiency associated with severe trauma, bums, injury or infection which comprises administering to a patient in need thereof at least one unit dosage of a micronutrient composition according to the present invention in a 24 hours period.

A further embodiment of the present invention relates to a method of treating a stress induced oxidant injury associated with severe trauma, bums, injury or infection which comprises administering to a patient in need thereof at least one unit dosage of a micronutrient composition according to the present invention in a 24 hours period.

Yet another embodiment includes a method of promoting wound healing which comprises administering to a patient in need thereof at least one unit dosage of a micronutrient composition according to the present invention in a 24 hours period.

In a preferred embodiment, at least two unit dosage forms of the inventive composition are administered to a patient in need thereof in a 24 hours period.

In a particularly preferred embodiment, at least three unit dosage forms of the inventive composition are administered to a patient in need thereof in a 24 hours period.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE INVENTION

The present invention relates to a micronutrient composition which includes amino acids, i.e., glutamine and arginine, vitamins and trace inorganic minerals. The composition is useful for treatment of major injury, burns, infection and critical illness and the different etiologies associated therewith, wherein the malady is characterized by a deficiency state of the essential amino acids, vitamins and minerals. Specifically, each of major injuries, burns, infections, critical illness and wounds are characterized by low levels of key nutrients in the plasma. It is these deficiencies which the inventive composition serves to alleviate and thus aid in repair of the damage associated with each of the maladies recited above.

I. The Stress Response Associated With Injury, Infection, Critical Illness

A stress response results in profound metabolic abnormalities following the combination of the release of inflammatory mediators and the development of an abnormal "stress induced" hormonal environment. An increase in the proinflammatory cytokines TNF, $IL_6$, $IL_8$ and increased oxidant activity, result in increased cell damage and protein degradation. The cell damage and protein degradation result in an increase in endogenous catabolic hormones. An increase in the endogenous hormones, such as catechols and cortisol, and a decrease in normal endogenous anabolic activity lead to a large net protein loss. In addition, a profound increase in cell energy demands arises, markedly increasing the need for nutrient utilization, while at the same time energy production becomes very inefficient. The degree of increase in metabolic rate varies with the degree of the systemic injury.

Although the peak hypermetabolism and increased energy demand may not be evident for several days, it is now clear that this process begins immediately post injury.

An entire spectrum of abnormalities can be seen after injury, infection, and inflammation as a manifestation of the host "stress response" initiated by a wound or an infection. If uncontrolled, this process becomes autodestructive. Supporting the metabolic machinery is necessary to avoid further deterioration.

II. The Stress Induced Catabolic Disorders

Lean body mass (LBM) makes up 70% of body weight, with 75% of the LBM being water and 20% of the LBM being protein. All protein content of the body is present in the LBM compartments. Each protein molecule has a functional role in maintaining homeostasis.

The degree of lean mass loss, or body protein loss, in a catabolic state is correlative to morbidity and mortality. Lean mass loss exceeding 10% of total, can occur within a week after severe injury, despite provision of appropriate macronutrients, carbohydrates, fat and protein. A loss of lean mass exceeding 10% of total will result in an immune deficiency state. When losses exceed 15% of body protein, there is also a marked increase in infections, severe weakness, skin breakdown (pressure sores), and the absence of wound healing. A loss of lean body mass exceeding 40% is usually fatal.

III. Stress Induced Oxidant Injury Antioxidant Depletion

Excess oxidant release is known to produce further tissue injury. Oxidants are very unstable metabolites of oxygen released mainly by inflammatory cells when activated. The oxidants injure tissue by reacting with the cell membrane lipid layers and tissue proteins, thereby producing biochemical damage via the oxidation process. Oxidation of lipids, particularly those in the cell membrane, result in a self-perpetuating process known as lipid peroxidation. Lipid peroxidation results in an alteration in cell membrane function. Post injury red cell hemolysis is caused by oxidant cell membrane injury. Proteins attacked by oxidants will be denatured, a problem of specific concern with respect to enzymes and interstitial structural proteins.

Oxidant injury begins immediately after severe injury or infection. In fact, circulating lipid peroxides, markers of cell damage, are seen in plasma within hours of an injury. Tissue injury is evidenced by lipid peroxidation in lung, liver and other systemic organs. In addition, cell energy charge produced by ATP (adenosine triphosphate) and ADP (adenosine diphosphate), is diminished. Oxidants are known to produce a decrease in cell energetics and antioxidant administration has been shown to attenuate the process.

The ongoing oxidant release rapidly leads to a depletion of normal endogenous antioxidant defenses. With an antioxidant deficiency state, fewer oxidants are needed for injury to occur, a classic example being the adult respiratory distress syndrome.

IV. Immune Deficiency State And Increased Infections

Infections are a common complication after severe injury and are also a common cause of the "stress response" and its resulting metabolic abnormalities. There are well defined immune deficiency states which are characterized by micronutrient deficiencies. For example, neutrophil dysfunction impairs chemotaxis, cell adherence and bacterial killing and increases tissue release of oxidants. Dysfunction of T-lymphocytes decreases lymphokines, decreases antigen responsiveness and decreases B-cell activation. Dysfunction of B-lymphocytes decreases antibody production. Decreased surface defenses from catabolism can cause decreased respiratory muscle function decreased wound healing capacities of the functioning cells and may impair graft and skin barrier functions.

V. Wound Healing Impairment

Maintaining an optimum, wound healing environment is essential for trauma or burn patients as it has been discussed that the wound healing process is activated immediately after the injury process.

Inadequate amino acid substrate impairs the rate and quality of healing for tissue synthesis. Initially the wound takes priority for protein substrates. Any loss of lean mass, exceeding 15% of total, will result in a diversion of protein substrate away from the wound and back toward restoration of lean mass. The greater the net loss of body protein, the greater the impairment to healing. The lack of key amino acids, in particular glutamine, and key micronutrients known to be deficient after severe injury or critical illness will impair the rate of healing. Furthermore, infection also impairs healing.

The inventors have devised a therapeutic micronutrient composition useful for treating patients with severe trauma, burns, injury, infection and for promoting wound healing associated with stress responses, stress induced catabolism, stress induced oxidant injury, and immune deficiency states.

Each of the components serves to provide nutrients for varying functions within the physiological system of the patient.

Glutamine is the most abundant amino acid in the body comprising two thirds of the amino acid pool. Under normal conditions glutamine is a non-essential amino acid and requirements can be met by endogenous production. Synthesis of glutamine occurs mainly in skeletal muscle from any of the other amino acids in muscle portein via the generation of alpha ketoglutatrate which can then be converted to glutamate and then to glutamine. However, in stress states such as trauma and burns, glutamine is an essential amino acid and exogenous glutamine is essential. As endogenous production of glutamine is totally inadequate to meet the increased needs during injury, exogenous glutamine is needed. A glutamine deficiency state is well recognized immediately after burns and trauma or critical illness. The intra- and extra-cellular functions of glutamine are therefore impaired.

A well recognized glutamine deficiency state has been demonstrated within 48 hours after major injury or illness with a 50% decrease in both plasma and tissue levels.

Despite its well known importance for decreasing morbidity and improving recovery, glutamine replacement has only recently become a more standard therapy. L-glutamine is the active form to be replaced. Because of poor solubility, glutamine is absent in standard parental nutrition formulas as well as virtually all commercially available nutrient supplements. Normal food is also a poor source of glutamine. Recently new formulations have allowed a glutamine enriched parenteral nutrition formulation. However, because of increased expense, it is not widely used. Glutamine replacement is best performed using the enteral route. A water soluble powder form is preferable as it can be taken with juice or via a feeding tube.

Glutamine capsules usually contain only 500 mg thus requiring intake of over 50 capsules daily to treat stress associated conditions. Because at least 30% of amino acid efflux from muscle during stress is glutamine, the recommended replacement is comparable to 30% of net protein losses (about 100–150 /day). Therefore, 0.4–0.5 g/kg weight of patient/day of glutamine is replaced orally expecting that a portion will be used by the gastrointestinal system.

Glutamine, having two nitrogen atoms, is the most important carrier of nitrogen between organs. The nitrogen added to the cell is needed for protein synthesis as well as for purine and pyrimidine production used for DNA and RNA synthesis. Glutamine can carry excess nitrogen away from the cell to the liver for urea formation or formation of ammonia cleared by the kidney. The ability of glutamine to be available for tissue use is dependent on maintenance of adequate plasma levels. The plasma level of protein is based on the rate of de novo protein production and also the rate of protein breakdown. The main tissue donor for protein breakdown is muscle mass. The liver orchestrates this metabolic activity, usually by increasing muscle catabolism especially after trauma, burn or other severe stress states. Glutamine also is used directly by the cell for energy. Metabolism to alpha ketoglutarate leads to complete oxidation via the Krebs cycle yielding 30 moles of ATP per mole of glutamine.

There is an overall decrease in cell energetics or energy charge in the form of ATP and ADP after burn injury affecting multiple organs. This decrease in energy can diminish cellular function. The energy decrease correlates with decreased tissue glutamine and glutahione. Increased demands for energy post injury result in up to a 50% decrease in plasma and intracellular glutamine levels within 24 hours after a severe injury.

Since glutamine is a key factor in a number of biological actions post injury, utilization after injury by the body is markedly increased. Increased endogenous production comes primarily from muscle protein. Glutamine is released directly from muscle protein and is also synthesized from other muscle protein amino acids. A glutamine deficiency will increase catabolic rate. Maintenance of lean body mass (LBM) is extremely important as the percent loss of body mass is directly proportional to complications and decreases in LBM of over 10% can occur within a week post injury. Also, since the rate of restoration of LBM is 10–15 times longer than the rate of loss, maintenance of LBM is preferred to replacement.

Glutathione (GSH), a tripeptide of glutamine, cysteine and glycine is one of the most important endogenous cell antioxidants. The reduced form GSH, when absorbing oxidants, is converted to the oxidized form GSSG which is either converted back to GSH in the cell or expelled as the oxidized form, thus requiring continual replacement. The GSH–GSSG activity depends on the enzymes, glutathione peroxidase and glutathione reductase. Selenium is a key co-factor in this enzyme activity. See Welhowine et al., *J Nutr. Biochem.*, volume 4, pages 236–242 (1993).

GSH (a water soluble substance) acts primarily in the cytosol and in plasma, but it is also important in maintaining cell membrane vitamin E in its active reduced form. GSH is present in all cells but is made primarily in the liver and exported to other tissues, especially the lungs where the GSH is also a key antioxidant in red blood cells. A deficiency of GSH will lead to increased fragility and hemolysis.

Plasma and tissue GSH levels decrease rapidly after severe injury and inflammation due to both rapid use and decreased production. Decreased liver production of GSH is due mainly to a lack of adequate substrate glutamine and cysteine.

GSH levels in the liver fall within 24 hours of injury which means all tissue levels will be affected. Liver dysfunction, hemolysis and acute respiratory failure are all well recognized complications of a GSH deficiency in the presence of inflammation.

Increasing GSH levels in the liver is primarily met by replacing glutamine, cysteine as N-acetyl-cysteine and selenium.

Glutamine is a major fuel source for immune cells, especially lymphocytes and macrophages, both key types of immune cells. In addition, glutamine has been shown to be involved with bacterial killing by neutrophils. Clinical trials have demonstrated that glutamine supplementation decreased infection rate, improved lymphocyte function after surgery, and improved $CD_4/CD_8$ ratios in critically ill patients. See, for example, Parry-Billings et al., *The Lancet*, volume 338, pages 523–525 (1990).

One of the major effects of glutamine supplementation is its protective effect on the gut barrier. Glutamine is the major fuel for the gut enterocyte and glutamine deficiency will decrease the gut mucosal barrier function leading to 'gut leak'. The bacterial translocation process is considered to be a major causative factor in post injury or illness induced sepsis. In addition glutamine's anticatabolic activity will decrease infection risk.

Glutamine assists in the wound healing process via direct utilization for fuel as well as indirectly by its anti-catabolic effects. Glutamine is a primary fuel for proliferating fibroblasts and macrophages—both key cells in the wound healing process. Glutamine is the primary amino acid used by the fibroblasts as an energy source in order to make collagen. Macrophages direct the healing process via release of growth factors. Macrophages depend on glutamine for growth factor production. Due to the increased usage, a glutamine deficiency state can occur rapidly. A unit dosage of the composition according to the present invention may contain between about 8 grams to 15 grams of L-glutamine. In a particularly preferred embodiment, the unit dosage form contains 10 g of L-glutamine. A preferred dosage is between 20 and 30 grams of Lg-lutamine per day to replete this sate of catabolic deficiency. Thus, at least one unit dosage would be administered per day. It is preferred that two to three unit dosages would be administered per day.

Arginine is another key amino acid for the stressed patient which has been shown to have a wide range of important biologic effects especially when provided as a dietary supplement. These benefits include metabolic support immune system augmentation, improved wound healing and stimulation of overall anabolism. Arginine is classified as a conditionally necessary amino acid, especially with injury where increased demands are present as a deficiency state. Its main endogenous source comes from citrulline which in turn is generated from glutamine. The most important pathway of arginine metabolism is its conversion to ornithine in the liver, which is an obligatory precursor for peptide and protein synthesis. It is also required for the synthesis of muscle creatinine used for energy.

Arginine actively stimulates the release of a number of anabolic hormones which activate overall protein synthesis and wound healing. These include insulin, growth hormone and insulin like growth hormone, and insulin like growth factor-1. Arginine is also known to stimulate the immune system, namely through enhanced lymphocyte activity with increasing natural killer and lymphokine activated killer cytotoxicity.

After severe burn and trauma, a deficiency state is recognized wherein plasma levels decline by over 40% within several weeks of injury. The deficiency state is primarily due to increased metabolism of ornithine and other key metabolic byproducts while synthesis rate remains constant.

The specific dose of arginine with stress in unknown. Doses exceeding 40 grams a day are known to be non-toxic. In the present inventive composition, L-arginine is present as zinc arginate. The arginate increases the bioavailability of L-arginine. A unit dosage of the composition according to the present invention may contain between about 100 mg to about 250 mg of L-arginine. In a particularly preferred embodiment, the unit dosage form contains 140 mg of L-arginine. A preferred dosage is between about 250 and about 500 mg of L-arginine per day to replete this state of catabolic deficiency. Thus, at least one unit dosage would be administered per day. It is preferred that two to three unit dosages would be administered per day.

N-acetylcysteine (NAC), a sulfur containing compound containing the amino acid cysteine, is a critical substrate for glutathione GSH synthesis which has direct antioxidant properties and therefore along with glutamine, is a rate limiting factor in GSH production. NAC also appears to have endothelial derived relaxing factor properties, as well as protective properties and may, therefore, improve microvascular blood flow. Cysteine is also a key compound used in may immune defenses, especially the lymphocyte function as well as key sulfur containing proteins. Cysteine deficiency is well recognized with critical illness. Cysteine deficiency is also well described with severe infection and chronic illness. Cysteine content of standard foods and tube feedings is insufficient to correct a deficiency state. A unit dosage of the composition according to the present invention may contain between about 0.5 g to about 1 g of N-acetylcysteine. In a particularly preferred embodiment, the unit dosage form contains 600 mg of N-acetylcysteine. A preferred total dosage is between about 1 and about 2 g of N-acetylcysteine per day to replete this sate of catabolic deficiency. Thus, at least one unit dosage would be administered per day. It is preferred that two to three unit dosages would be administered per day.

Vitamins are organic substances that are essential in humans for growth and homeostasis. Vitamins are essential nutrients found in very small quantities in the body. Each has a name defined by a letter as well as a chemical name. These compounds play a key role in metabolism, growth and homeostasis and therefore are especially important in surgical critical illness, in which hypermetabolism, healing, and immune function are so important for survival. A deficiency state, which can occur readily, clearly will amplify the magnitude of disease.

Vitamins, in general, are not chemically related and as a result, each has a variety of unrelated functions.

Fat-soluble vitamins (such as A, D, E, K) are absorbed in the intestinal tract with lipids and require bile salts for absorption. These vitamins can be stored, to some degree, so toxicity can occur with excessive use.

Water-soluble vitamins, with the exception of vitamin C, belong to the B complex. The B-vitamin group can be further divided into energy-releasing and hematopoietic stimulants. Absorption is more rapid than fat-soluble vitamins, they are not stored (exception vitamin B 12), and they are excreted in the urine. Toxicity is extremely rare except in the presence of renal failure, and a deficiency can occur rapidly.

B complex vitamins play a critical role in energy production and protein synthesis and are an essential component for supporting the hypermetabolic bum-trauma or infected patient. In addition, the B complex vitamins have an added role in hematopoesis. Since these water soluble compounds are not stored they must be provided on a daily basis. The increased utilization in a 'stressed' patient requires an increased provision, well above that required by the non-stressed individual.

A vitamin B deficiency state is characterized by impaired cell energetics, weight loss and poor healing, all of which can be seen with critical illness. Thus, the B complex vitamins are contained in the composition of the present invention.

Thiamin plays an essential role in energy transformation because it is necessary for the oxidative decarboxylation of pyruvate and α-ketoglutarate. Lack of TDP (thiamin diphosphate) prevents adenosine triphosphate synthesis. It is also involved in the synthesis of nicotinamide-adenine dinucleotide phosphate, a key compound in energy formation and oxidation-reduction reactions. A deficiency state has been well documented after critical illness.

Replacement therapy of thiamin in critical illness or injury metabolic rate is markedly increased, thereby increasing the need for TDP. A unit dosage of the composition according to the present invention may contain between about 5 mg to about 10 mg of thiamin. In a particularly preferred embodiment, the unit dosage form contains about 6 mg of thiamin. A preferred dosage is between about 10 and about 20 mg of thiamin per day to replete this state of catabolic deficiency. Thus, at least one unit dosage would be administered per day. It is preferred that two to three unit dosages would be administered per day.

Riboflavin is water soluble and rapidly absorbed by a saturable carrier mechanism in the proximal intestine. The vitamin exists as riboflavin, flavinmononucleotide, or flavin adenine dinucleotide. These compounds are transported by plasma proteins. The free vitamin then is released into the cell, and is widely distributed. The flavins function as cofactors for a variety of oxidative enzyme systems mainly energy production through ATP production. They can act as oxidizing agents because of their ability to accept a pair of electrons. Flavins are involved in the decarboxylation of pyruvate as well as in the Krebs cycle. Flavins are also necessary for wound healing. Increased energy utilization and metabolic rate indicate the need for more riboflavin because requirements are increased with increased carbohydrate and protein metabolism. A unit dosage of the composition according to the present invention may contain between about 5 mg to about 13 mg of riboflavin. In a particularly preferred embodiment the unit dosage form contains about 6.8 mg of riboflavin. A preferred dosage is between about 10 and about 25 mg of riboflavin per day to replete this state of catabolic deficiency. Thus, at least one unit dosage would be administered per day. It is preferred that two to three unit dosages would be administered per day.

The micronutrient niacin is generated by both nicotinic acid and nicotinamide. These water-soluble compounds are readily absorbed in the small intestine. The circulating form of the vitamin is niacinaminde, which readily diffuses across cell membranes. Niacin is a component of nicotinamide adenine dinucleotide (NAD) and its phosphate, which are necessary for the dehydrogenation reactions that occur in the metabolism of crabohydrates and proteins and in cell respiration. Niacin is necessary for carbohydrate metabolism and protein synthesis. Niacin also potentiates the action of insulin. Much of niacin is converted to NAD in the body for use in oxidative phosphorlyation so a continuous supply is needed. In the inventive composition the niacin does depends on metabolic rate and caloric use of the patient because niacin is involved in metabolism, as are all the B vitamins. A unit dosage of the composition according to the present invention may contain between about 60 mg to about 120 mg of niacin. In a particularly preferred embodiment the unit dosage form contains about 80 mg of niacin. A preferred dosage is between about 150 mg and about 300 mg of niacin per day to replete this state of catabolic deficiency. Thus, at least one unit dosage would be administered per day. It is preferred that two to three unit dosages would be administered per day.

Vitamin $B_6$ exists in five different structural forms which are comparably active. Absorption of the vitamin occurs primarily in the jejunum, where it is released from its phosphorylated form by the action of intestinal phosphatases. In the bloodstream, the different structural forms are transported to the liver, where they are all converted to pyridoxal, which then is transported to the tissues for utilization. The coenzyme form of vitamin $B_6$ is associated with a number of enzymes, most of which are involved in amino acid metabolism and protein synthesis as well as nucleic acids and red cell production. The byproducts of vitamin $B_6$ metabolism are excreted via the liver. Requirements for vitamin $B_6$ have been found to be related to the level of protein intake, and both trauma and burns have been shown to increase requirements. A unit dosage of the composition according to the present invention may contain between about 7 mg to about 15 mg of vitamin $B_6$. In a particularly preferred embodiment the unit dosage form contains 8 mg of vitamin $B_6$. A preferred dosage is between about 15 and about 30 mg of vitamin $B_6$ per day to replete this state of catabolic deficiency. Thus, at least one unit dosage would be administered per day. It is preferred that two to three unit dosages would be administered per day.

Pantothenic acid is ubiquitous in nature. Most of the vitamin is in the form of coenzyme A. During absorption, it is converted back to the natural vitamin. Antibiotics may function to decrease synthesis of pantothenic acid. Pantothenic acid plays a part in the function of co-enzyme A which has a role in metabolism and energy production from carbohydrate, fat and protein. A deficiency will impair healing or new tissue growth as well as decrease leukocyte production and antibody formation. Pantothenic acid and the other B vitamins-thiamin, riboflavin and niacin are involved in the oxidative decarboxylation of pyruvate and α-ketoglutatrate, a key process for cell energy production. A unit dosage of the composition according to the present invention may contain between about 35 mg to about 150 mg of pantothenic acid. In a particularly preferred embodiment, the unit dosage form contains about 40 mg of pantothenic acid. A preferred dosage is between about 80 and about 300 mg of pantothenic acid per day to replete this state of catabolic deficiency. Thus, at least one unit dosage would be administered per day. It is preferred that two to three unit dosages would be administered per day.

Folic acid is necessary for DNA synthesis, protein synthesis and red cell formation. Folate is also known to be a xantenic oxidase enzyme inhibitor thereby decreasing any ischemia reperfusion induced injury which is common after trauma, burns or shock. Deficiency state is characterized by weakness, weight loss and depressed cell mediated immunity. A unit dosage of the composition according to the present invention may contain between about 350 μg to about 750 μg of folic acid. In a particularly preferred embodiment, the unit dosage form contains about 400 μg of folic acid. A preferred dosage is between about 800 and about 1500 μg of folic acid per day to replete this state of catabolic deficiency. Thus, at least one unit dosage would be administered per day. It is preferred that two to three unit dosages would be administered per day.

Vitamin $B_{12}$ is absorbed in the distal small bowel. This compound is required for transfer of methyl groups in the synthesis of nucleic acids and choline. Deficiency results in an impairment of cellular division resulting in anemia and leukopenia and generalized weakness. A unit dosage of the composition according to the present invention may contain between about 25 μg to about 100 μg of vitamin $B_{12}$. In a particularly preferred embodiment the unit dosage form contains about 50 μg of vitamin $B_{12}$. A preferred dosage is between about 50 μg and about 200 μg of vitamin $B_{12}$ per day to replete this sate of catabolic deficiency. Thus, at least one unit dosage would be administered per day. It is preferred that two to three unit dosages would be administered per day.

The water soluble vitamin, vitamin C, cannot be made by the body and must be consumed from outside sources. Since it has a very short half life (hours), daily consumption of large quantities is required in the stress state to avoid a deficiency state. The role of vitamin C (ascorbic acid) in the body is very complex, despite its simple structure. It is water soluble, so distribution is in the total body water space. A number of important functions for vitamin C are recognized. The most prominent roles are as an antioxidant and in the wound healing process. Vitamin C is present in plasma and cell cytosol as an antioxidant. Its role is to absorb oxidant vital structures can be altered. The oxidized vitamin C is then excreted. Recent studies in burn patients have demonstrated that high doses of ascorbic acid (2–10 grams) given during burn resuscitation significantly decrease the vascular permeability and fluid requirements indicating the role of both oxidants and antioxidants to the patient after burn injury. Vitamin C is also important in maintaining vitamin E and GSH in its reduced form after oxidation by oxidants. Vitamin C supplementation has a role in wound healing because of its role in hydroxylation of protein and lysine in collagen strands, which are necessary for collagen cross linking. Ascorbic acid also plays a critical role in fatty and metabolism through carnitine production as well as its role in maintaining neutrophil functions.

Plasma and cell levels of vitamin C have been reported to decrease by over 50% in trauma, burn and critically ill patients. The decrease in plasma levels correlates with increased plasma lipid peroxides. This deficiency not only increases oxidant injury but also impairs neutrophil function and healing. A unit dosage of the composition according to the present invention may contain between about 0.25 g to about 1.00 g of vitamin C. In a particularly preferred embodiment the unit dosage form contains about 0.50 g of vitamin C. A preferred dosage is between and 1 g and 2 g of vitamin C per day to replete this state of catabolic deficiency. Thus, at least one unit dosage would be administered per day. It is preferred that two to three unit dosages would be administered per day. In addition, doses of over 2 grams parenterally during fluid resuscitation improve hemodynamic stability.

The carotenoids are a fat soluble formula of 40 carbon esters which include β-carotene, a potent antioxidant as well as vitamin A precursor. A portion of exogenous β-carotene will be converted to Vitamin A. In the present inventive composition, the vitamin A is provided in the form of β-Carotene.

Vitamin A is a fat soluble multipurpose substance involved in immune defense responses and wound healing. Vitamin A, also known as retinol, is transported on retinol binding protein (RBP). A decrease in RBP, which occurs post injury, will impair retinol delivery to tissues. As opposed to water soluble vitamins, vitamin A is stored in the liver. However, decreased serum levels have been reported in burn and trauma patients and supplementation has been reported to decrease infection rates. In addition, impaired wound healing caused by systemic steroids can be reversed by systemic or topically applied Vitamin A which can activate the wound healing process.

β-Carotene is a lipid soluble vitamin and precursor which has potent antioxidant activity, similar to Vitamin E, decreasing lipid peroxidation. Deficiency and replacement therapy levels are decreased after injury due to utilization during oxidant stress and lack of replacement. A unit dosage of the composition according to the present invention may contain between about 1,500 IU to about 7,500 IU of vitamin A. In a particularly preferred embodiment, the unit dosage form contains about 5,000 IU of vitamin A. A preferred dosage is between about 3,000 IU and about 10,000 IU of vitamin A per day to replete this state of catabolic deficiency, assuming that a portion of the β-carotene administered will be converted to Vitamin A. Thus, at least one unit dosage would be administered per day. It is preferred that two to three unit dosages would be administered per day.

The main antioxidant activity function of vitamin E is to avoid cell-membrane damage oxidants. The vitamin E which resides in the fat layer of the cell membrane acts as an antioxidant by becoming oxidized to protect the surrounding membrane lipid. In addition, vitamin E is most important in preventing the lipid peroxidation chain reaction, which can self perpetuate in the absence of vitamin E. A deficiency of vitamin E will lead to a potentiation of oxidant induced cell membrane damage. Oxidized vitamin E is returned to its antioxidant reduced form by cytosol reduced vitamin C and glutathione (GSH) which in turn becomes oxidized. GSH needs to be replaced continuously as it can be lost from the cell once in the oxidized form. Therefore, maintaining adequate cell membrane protection means vitamin E, vitamin C and GSH must be maintained. Vitamin E has also been shown to enhance the immune response. Vitamin E levels decrease rapidly after stress states, especially burns and trauma due to rapid consumption by the released oxidant and the lack of adequate replacement. Plasma and tissue levels are decreased in 24–48 hours but replacement often lags well behind these losses.

A decrease in vitamin E levels in injured patients corresponds with an increase in plasma lipid peroxides which are markers of oxidant damage. Since vitamin E is fat soluble, parenteral replacement is limited. Administration by the oral route as soon as possible is the optimum approach. A unit dosage of the composition according to the present invention may contain between about 100 IU to about 300 IU of vitamin E. In a particularly preferred embodiment, the unit dosage form contains about 200 IU of vitamin E. A preferred dosage is between about 200 IU and about 600 IU of vitamin E per day to replete this sate of catabolic deficiency. Thus, at least one unit dosage would be administered per day. It is preferred that two to three unit dosages would be administered per day.

Magnesium is a macromineral with numerous key roles in metabolism, cell protection and immune function. Key roles include production of ATP through phosphate transfer reactions. In fact, magnesium is a key factor in most adenosine tryphosphate dependent enzyme reactions as well as protein synthesis reactions. Also, the $Na^+K^+$ ATP pumps are magnesium dependent.

Magnesium deficiency is extremely common in early post injury and critical illness. Also, hypomagnesemia occurs with refeeding as new cell growth consumes large quantities. A magnesium deficiency state effects cell metabolism, energy production, protein synthesis and immune dysfunction. A unit dosage of the composition according to the present invention may contain between about 100 mg to about 300 mg of magnesium. In a particularly preferred embodiment, the unit dosage form contains about 200 mg of magnesium. A preferred dosage is between about 200 mg and about 600 mg of magnesium per day to replete this sate of catabolic deficiency. Thus, at least one unit dosage would be administered per day. It is preferred that two to three unit dosages would be administered per day.

Micronutrients are essential for cellular function. Micronutrients useful in the present inventive composition include zinc, selenium and copper. They are called nutrients because of their key role in metabolism, but these compounds and elements also are involved in many other aspects of homeostasis, including wound healing, antioxidant protection and immune function. The term "micro" is used because of the extremely small amounts found in the circulation. Their concentrations are critical to cellular function.

Zinc has been a well studied trace element because of its biologic importance. Zinc is a trace element that can exist in several different valence states but usually is divalent. The total body amount of zinc is about 1.5 to 3 g. Zinc is moderately well absorbed from the gastrointestinal tract, varying from 14% to 41% complexing which improves absorption. Zinc has an immense number of biologic roles. Zinc is administered in the form of an arginate which increases bioavailability. A unit dosage of the composition according to the present invention may contain between about 15 mg to about 60 mg of zinc. In a particularly preferred embodiment, the unit dosage form contains about 20 mg of zinc. A preferred dosage is between about 40 mg and about 100 mg of zinc per day to replete this state of catabolic deficiency. Thus, at least one unit dosage would be administered per day. It is preferred that two to three unit dosages would be administered per day.

Selenium is present in all tissues in large part due to its critical role in cell glutathione antioxidant protection as a key cofactor for the enzyme glutathione peroxidase. Selenium absorption is in the ragne of 50 to 100% depending on the carrier. Selenium in addition to its well known role as an antioxidant cofactor plays a role in a number of enzyme systems central to metabolic activity especially in the function of the cytochrome P450 system. Also, selenium is required for thyroid function activity. A well recognized selenium deficiency state has been reported in burn trauma and critically ill patients. See Hunt, *J. Parent. Ent Nutr.*, vol. 8, pages 695–700 (1984). A increased urinary loss is partially responsible. As with most key micronutrients, the deficiency occurs early within several days. A unit dosage of the composition according to the present invention may contain between about 70 µg to about 120 µg of selenium, in a particularly preferred embodiment, the unit dosage form contains about 100 µg of selenium. A preferred dosage is between about 150 µg and about 300 µg of selenium per day to replete this sate of catabolic deficiency. Thus, at least one unit dosage would be administered per day. It is preferred that two to three dosages would be administered per day.

Copper (Cu) is widely distributed in human tissues. Although found in micro amounts, this element is a key cofactor for many biologic functions required in critical illness. Copper deficiency is well recognized after major burns and trauma. The deficiency state is felt to be in part due to decreased ceruloplasmin, the major carrier of copper. Also urinary losses are markedly on the increase. The deficiency state is most evident after about 2 weeks post insult. Replacement of Cu rapidly corrects any deficiency. A unit dosage of the composition according to the present invention may contain between about 0.50 mg to about 1.50 mg of copper. In a particulary preferred embodiment, the unit dosage form contains about 0.75 mg of copper. A preferred dosage is between about 1.5 mg and about 2.5 mg of copper per day to replete this state of catabolic deficiency. Thus, at least one unit dosage would be administered per day. It is preferred that two to three unit dosages would be administered per day.

Methods of Dosing

The dosage administered to patients is guided by a physician skilled in the art on a case by case basis. Patients may receive multiple doses of a composition according to this invention per day depending on the amount the composition needed for the patients' particular condition, nutritional needs, and body size. Where the compositions contain about 10 g glutamine, on average, patients preferably will receive 2 to 4 doses per day but doses can range from 1 dose per day to a much higher level as determined by the patient's physician or health care provider.

A unit dosage form means that the inventive composition is administered in a convenient form, such as, a premeasured lyophilized powder which can be reconstituted and administered to the patient as part of a daily regime. This can be mixed with juice, tea or another form of liquid. The dosage can also be administered by mixing the lyophilized powder into moist food such as applesauce or puddings.

Methods of Manufacture

The claimed composition can be made by methods known to those skilled in the art. The elements comprising the composition are prepared by standard methods of blending and mixing at temperatures and moisture contents which allow blending to take place. The elements comprising the composition are preferably utilized in a dispersable form.

In another embodiment, the claimed composition can be prepared using a standard wet process involving taking the product into a slurry, then processing it through heating it to high temperatures known to those skilled in the art then placing it into a separate chamber where it is blended and granulated.

Methods of Administration

The methods of administration can be either oral dosing or via a feeding tube. For an oral dose at least one unit dosage form is admixed with a beverage or a moist semi-solid food at room temperature. It is recommended that ice cold beverages and liquids be avoided for admixture with the unit dosage of the micronutrient composition. For use with a feeding tube, a unit dosage form of the micronutrient composition is admixed with at least 60 cc of water and infused to a patient via a syringe to a feeding tube. The feeding tube is flushed with additional water and feeding via the tube is continued as per normal use.

Other embodiments of the invention will be apparent to those skilled in the art from consideration of the specification and practice of the invention disclosed herein. It is intended that the specification be considered as exemplary only, with the true scope and spirit of the invention being indicated by the following claims.

As used herein and in the following claims, singular articles such as "a", "an", and "one" are intended to refer to singular or plural.

What is claimed is:

1. A micronutrient composition in unit dosage form consisting essentially of at least about 8 grams L-glutamine, L-arginine, N-acetyl cysteine, vitamin A, vitamin C, vitamin E, thiamin, riboflavin, niacin, vitamin $B_6$, folate, vitamin $B_{12}$, pantothenic acid, magnesium, zinc, selenium and copper.

2. The micronutrient composition of claim 1, wherein said unit dosage form is between about 100 and about 250 mg L-arginine.

3. The micronutrient composition of claim 1, wherein said unit dosage form is between about 0.5 and about 1 gram N-acetyl cysteine.

4. The micronutrient composition of claim 1, wherein said unit dosage form is between about 1,500 and 7,500 IU vitamin A.

5. The micronutrient composition of claim 1, wherein said unit dosage form is between about 0.25 and about 1.00 gram vitamin C.

6. The micronutrient composition of claim 1, wherein said unit dosage form is between about 100 and about 300 IU vitamin E.

7. The micronutrient composition of claim 1, wherein said unit dosage form is between about 5 and about 10 mg thiamin.

8. The micronutrient composition of claim 1, wherein said unit dosage form is between about 5 and about 13 mg riboflavin.

9. The micronutrient composition of claim 1, wherein said unit dosage form is between about 60 and about 120 mg niacin.

10. The micronutrient composition of claim 1, wherein said unit dosage form is between about 7 and about 15 mg vitamin $B_6$.

11. The micronutrient composition of claim 1, wherein said unit dosage form is between about 350 and about 750 $\mu$g folate.

12. The micronutrient composition of claim 1, wherein said unit dosage form is between about 25 and about 100 $\mu$g vitamin $B_{12}$.

13. The micronutrient composition of claim 1, wherein said unit dosage form is between about 35 and about 150 mg pantothenic acid.

14. The micronutrient composition of claim 1, wherein said unit dosage form is between about 100 and about 300 mg magnesium.

15. The micronutrient composition of claim 1, wherein said unit dosage form is between about 15 and about 60 mg zinc.

16. The micronutrient composition of claim 1, wherein said unit dosage form is between about 70 and about 120 $\mu$g selenium.

17. The micronutrient composition of claim 1, wherein said unit dosage form is between about 0.50 and about 150 mg copper.

18. A micronutrient composition in unit dosage form consisting essentially of about 10 g of glutamine, about 140 mg L-arginine, about 600 mg of N-acetyl-cysteine, about 5,000 IU of vitamin A, about 500 mg of vitamin C, about 200 IU of vitamin E, about 6 mg of thiamin, about 6.8 mg of riboflavin, about 80 mg of niacin, about 8 mg of vitamin $B_6$, about 400 $\mu$g folate, about 50 $\mu$g vitamin $B_{12}$, about 40 mg of pantothenic acid, about 200 mg of magnesium, about 20 mg of zinc, about 100 $\mu$g selenium and about 0.75 mg of copper.

19. A method of treating a stress response associated with severe trauma, burns, injury or infection comprising administering at least one unit dosage of a micronutrient composition to a patient in need of such treatment in a 24 hour period, said micronutrient composition comprising glutamine, L-arginine, N-acetyl cysteine, vitamin A, vitamin C, vitamin E, thiamin, riboflavin, niacin, vitamin $B_6$, folate, vitamin $B_{12}$, pantothenic acid, magnesium, zinc, selenium and copper.

20. A method of treating an immune deficiency associated with severe trauma, burns, injury or infection comprising administering at least one unit dosage of a micronutrient composition to a patient in need of such treatment in a 24 hour period, said micronutrient composition comprising glutamine, L-arginine, N-acetyl cysteine, vitamin A, vitamin C, vitamin E, thiamin, riboflavin, niacin, vitamin $B_6$, folate, vitamin $B_{12}$, pantothenic acid, magnesium, zinc, selenium and copper.

21. A method of treating a stress induced oxidant injury associated with severe trauma, burns, injury or infection comprising administering at least one unit dosage of a micronutrient composition to a patient in need of such treatment in a 24 hour period, said micronutrient composition comprising glutamine, L-arginine, N-acetyl cysteine, vitamin A, vitamin C, vitamin E, thiamin, riboflavin, niacin, vitamin $B_6$, folate, vitamin $B_{12}$, pantothenic acid, magnesium, zinc, selenium and copper.

22. A method of treating a stress induced catabolic response associated with severe trauma, burns, injury or infection comprising administering at least one unit dosage of a micronutrient composition to a patient in need of such treatment in a 24 hour period, said micronutrient composition comprising glutamine, L-arginine, N-acetyl cysteine, vitamin A, vitamin C, vitamin E, thiamin, riboflavin, niacin, vitamin $B_6$, folate, vitamin $B_{12}$, pantothenic acid, magnesium, zinc, selenium and copper.

23. A method of promoting wound healing comprising administering at least one unit dosage of a micronutrient composition to a patient in need of such treatment in a 24 hour period, said micronutrient composition comprising glutamine, L-arginine, N-acetyl cysteine, vitamin A, vitamin C, vitamin E, thiamin, riboflavin, niacin, vitamin $B_6$, folate, vitamin $B_{12}$, pantothenic acid, magnesium, zinc, selenium and copper.

24. The method of claim 19, wherein at least two unit dosage forms are administered to a patient in need of such treatment in a 24 hour period.

25. The method of claim 19, wherein at least three unit dosage forms are administered to a patient in need of such treatment in a 24 hour period.

26. A micronutrient composition consisting essentially of between about 8 and about 15 grams L-glutamine, between about 100 and about 250 mg L-arginine, between about 0.5 and about 1 gram N-acetyl cysteine, between about 1500 and about 7500 IU vitamin A, between about 0.25 and about 1.00 grams vitamin C, between about 100 and about 300 IU vitamin E, between about 5 and about 10 mg thiamin, between about 5 and about 13 mg riboflavin, between about 60 and about 120 mg niacin, between about 7 and about 15 mg vitamin $B_6$, between about 350 and about 750 $\mu$g folate, between about 25 and about 100 $\mu$g vitamin $B_{12}$, between about 35 and about 150 mg pantothenic acid, between about 100 and about 300 mg magnesium, between about 15 and about 60 mg zinc, between about 70 and about 120 $\mu$g selenium and between about 0.50 and about 1.50 mg copper.

27. The micronutrient composition of claim 1, wherein said unit dosage form is between about 8 and about 15 grams L-glutamine.

28. The method of claim 19 wherein the composition is administered orally or via a feeding tube.

* * * * *